United States Patent
Fuss et al.

(10) Patent No.: US 8,089,290 B2
(45) Date of Patent: Jan. 3, 2012

(54) LIQUID WATER SENSOR SIGNAL CONDITIONING CIRCUIT FOR USE IN PEM FUEL CELLS

(75) Inventors: Robert L. Fuss, Spencerport, NY (US); Kenneth L. Kaye, Fairport, NY (US)

(73) Assignee: GM Global Technology Operations LLC, Detroit, MI (US)

(*) Notice: Subject to any disclaimer, the term of this patent is extended or adjusted under 35 U.S.C. 154(b) by 539 days.

(21) Appl. No.: 12/362,357

(22) Filed: Jan. 29, 2009

(65) Prior Publication Data

US 2010/0188108 A1 Jul. 29, 2010

(51) Int. Cl.
*G01R 27/08* (2006.01)
*H03B 19/00* (2006.01)
(52) U.S. Cl. .......................... 324/693; 327/113
(58) Field of Classification Search .................. 324/693; 327/113
See application file for complete search history.

(56) References Cited

U.S. PATENT DOCUMENTS

| | | | | |
|---|---|---|---|---|
| 3,933,046 A | * | 1/1976 | Ebrecht | 374/170 |
| 4,354,558 A | * | 10/1982 | Jageler et al. | 175/45 |
| 4,847,598 A | * | 7/1989 | Tucci et al. | 340/603 |
| 4,871,427 A | * | 10/1989 | Kolesar, Jr. | 324/443 |
| 5,744,973 A | * | 4/1998 | Bird | 324/707 |

* cited by examiner

*Primary Examiner* — Jeff Natalini
(74) *Attorney, Agent, or Firm* — John A. Miller; Miller IP Group, PLC

(57) ABSTRACT

A measurement circuit that has particular application for detecting a high impedance measurement signal from a liquid water sensor. The measurement circuit includes a high impedance resistance-to-frequency conversion circuit that is coupled to the sensor and receives a resistance signal therefrom. The resistance-to-frequency conversion circuit includes an oscillator that converts the resistance signal to a representative frequency. The measurement circuit also includes a frequency-to-voltage conversion circuit that receives the frequency signal from the resistance-to-frequency conversion circuit, and converts the frequency signal to a representative voltage that provides an indication of water on the sensor.

20 Claims, 3 Drawing Sheets

LIQUID WATER SENSOR SIGNAL CONDITIONING CIRCUIT FOR USE IN PEM FUEL CELLS

BACKGROUND OF THE INVENTION

1. Field of the Invention

This invention relates generally to a measurement circuit for measuring a high impedance resistance signal and, more particularly, to a measurement circuit for measuring a resistance signal from a liquid water sensor placed in a flow field of a fuel cell, where the measurement circuit includes a high impedance, resistance-to-frequency conversion circuit that receives the resistance signal and a frequency-to-voltage conversion circuit that converts the frequency signal from the resistance-to-frequency conversion circuit to a representative voltage.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is controlled to control the relative humidity of the membranes by controlling several stack operating parameters, such as stack pressure, temperature, cathode stoichiometry and the relative humidity of the cathode air into the stack.

During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, droplets form in the flow channels. As the size of the droplets increases, the flow channel is closed off, and the reactant gas is diverted to other flow channels because the channels are in parallel between common inlet and outlet manifolds. Also, as the droplet size increases, surface tension of the droplet may become stronger than the delta pressure trying to push the droplets to the exhaust manifold so the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

Determining the presence or absence of liquid water in a fuel cell flow field is generally desirable for the reasons discussed above. Therefore, development has been occurring in the art to provide a sensor that can be integrated into the channels or manifold of a fuel cell flow field, and that can indicate the presence of liquid water.

SUMMARY OF THE INVENTION

In accordance with the teachings of the present invention, a measurement circuit is disclosed that has particular application for detecting a high impedance measurement signal from a liquid water sensor. The measurement circuit includes a high impedance resistance-to-frequency conversion circuit that is coupled to the sensor and receives a resistance signal therefrom. The resistance-to-frequency conversion circuit includes an oscillator that converts the resistance signal to a representative frequency. The measurement circuit also includes a frequency-to-voltage conversion circuit that receives the frequency signal from the resistance-to-frequency conversion circuit, and converts the frequency signal to a representative voltage that provides an indication of water on the sensor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a measurement circuit for measuring a high impedance resistance signal and providing a representative voltage of the signal is merely exemplary in nature, and is in no way intended to limit the invention or its applications or uses. For example, the measurement circuit of the present invention has particular application for measuring a resistance signal from a liquid water sensor provided in a flow field of a fuel cell plate. However, as will be appreciated by those skilled in the art, the measurement circuit of the invention will have application for measuring other high impedance resistance signals for other applications.

Figure 1:
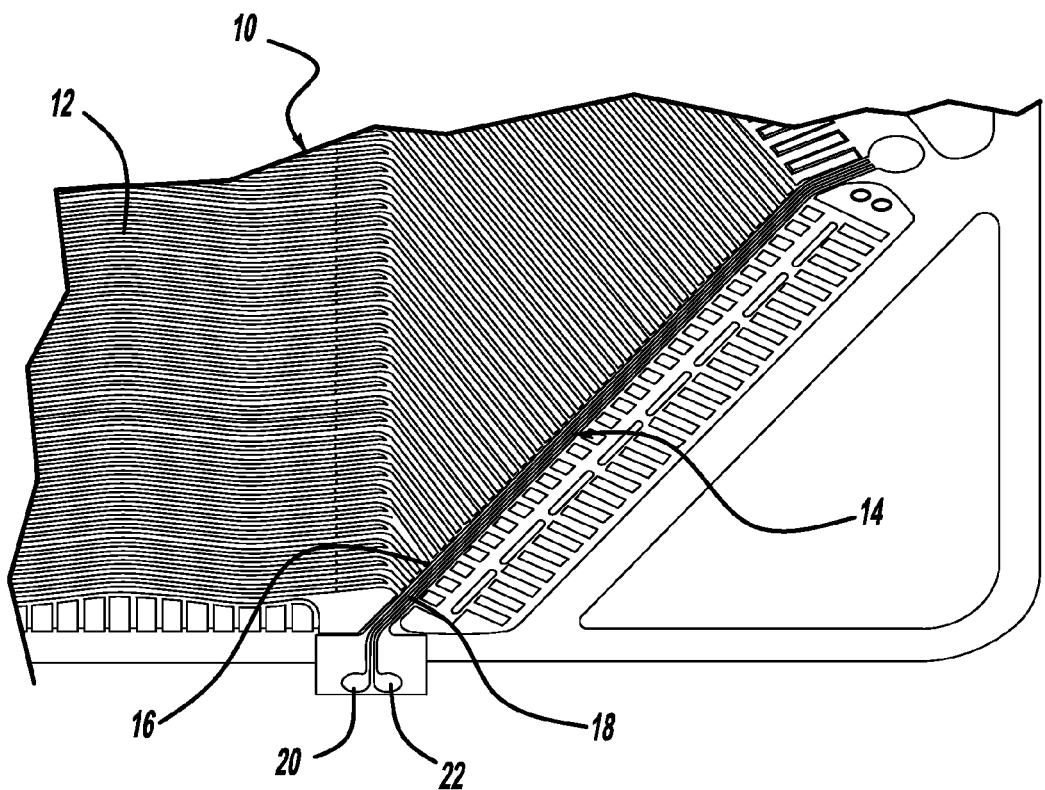
FIG. 1 is a plan view of a fuel cell bipolar plate including flow field channels and a liquid water sensor.
Figure 2:
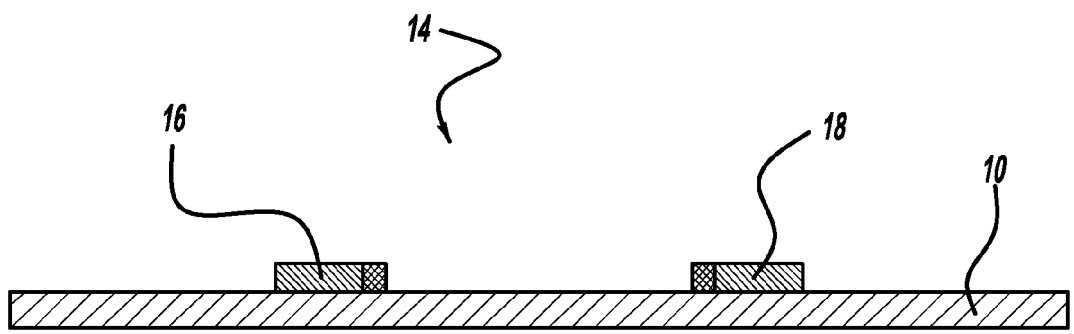
FIG. 2 is a cross-sectional view of the liquid water sensor on the flow field plate.

FIG. 1 is a broken-away top view of a flow field plate 10 for a fuel cell including a plurality of flow channels 12. In one non-limiting embodiment, the plate 10 is a stamped aluminum plate that forms the flow channels 12, where the plate 10 can be either a cathode side plate or an anode side plate. A sensor 14 is provided on the plate 10 and includes parallel electrode strips 16 and 18 spaced apart a certain distance. FIG. 2 is a cross-sectional view of the plate 10 showing the sensor 14 including the strips 16 and 18. An excitation signal can be provided to the strips 16 and 17 at contacts 20 and 22. The sensor 14 is strategically positioned on the plate 10 so that it is able to detect water in the flow channels 12, where a water droplet would lay across both of the electrode strips 16 and 18, changing the resistance of the sensor 14, which can be read by a measurement circuit that will be discussed in detail below.

In one non-limiting embodiment, the sensor 14 is positioned within a trough in the plate 10. The sensor 14 can be any sensor suitable for the purposes described herein that has the characteristics of high resistance when dry and lower resistance when wet.

As mentioned above, the resistance of the sensor 14 changes when a water droplet electrically couples the electrode strips 16 and 18, and a resistance signal from the sensor 14 would identify the change. The resistance signal would be based on a number of factors, such as the length of the strips 16 and 18 that is covered by the water, the purity of the water, the thickness of the water, etc. The resistance signal generated by the sensor 14 is a high impedance signal, typically on the order of 1 megaohm. Therefore, it is necessary to carefully select a proper measuring circuit that is able to be efficiently coupled to the sensor 10 at this impedance. In other words, the input impedance of the measuring circuit needs to be at least as high as the resistance circuit provided by the sensor 14 in order for the measurement circuit to be able to detect the resistance signal.

One consideration of the circuit design is that it measures an AC response signal. Particularly, the resistance across the gap between the electrode strips 16 and 18 must be measured using an AC perturbation current, instead of a DC current, in order to prevent the electrode strips 16 and 18 from becoming polarized. If a DC measurement were used, plating of the electrode strips 16 and 18 would occur over time and the resistance signal would change as a function of electrode surface. By using an AC perturbation signal, continuous reaction at each electrode strip 16 and 18 is prevented.

The measurement circuit would be designed to operate at the frequency of the AC perturbation current that varies as a function of the resistance between the electrode strips 16 and 18. In one non-limiting embodiment, the frequency of the perturbation current could vary between 4 kHz and 15 kHz. When the water bridges the gap between the electrode strips 16 and 18, a decrease in the resistance to the AC current can be detected. The resistance decreases proportionally according to the length of the strips 16 and 18 bridged by water. As the resistance drops, an oscillator frequency increases. At its wet-end limit, the sensor 14 has a resistance of only about 200 Kohm, corresponding to a frequency of 15 kHz. At its dry-end limit, the resistance of the gap between the electrode strips 16 and 18 can be 700 Kohm, corresponding to a frequency of 4 kHz.

Data acquisition system voltage inputs are much more common that frequency inputs. Therefore, a frequency-to-voltage conversion circuit can be coupled to the output of the oscillator circuit. This segment of the condition circuit converts the frequency output to a voltage output that can be fed into typical acquisition systems. At the limits, a 1 volt DC voltage output corresponds to 4 kHz frequency input and a 5 voltage DC voltage output corresponds to a 15 kHz frequency input.

Because of cell potential, especially in a fuel cell stack, DC isolation of the sensor 14 from the measurement circuit is important. To guarantee that the cell-stack potential doesn't influence or damage the measurement circuit, isolation capacitors can be used in the connections to the electrode strips 16 and 18. The current measurement/conditioning circuit can be designed to reject up to 50 volts DC, which is sufficient for single cell and short-stack operation.

Figure 3A:
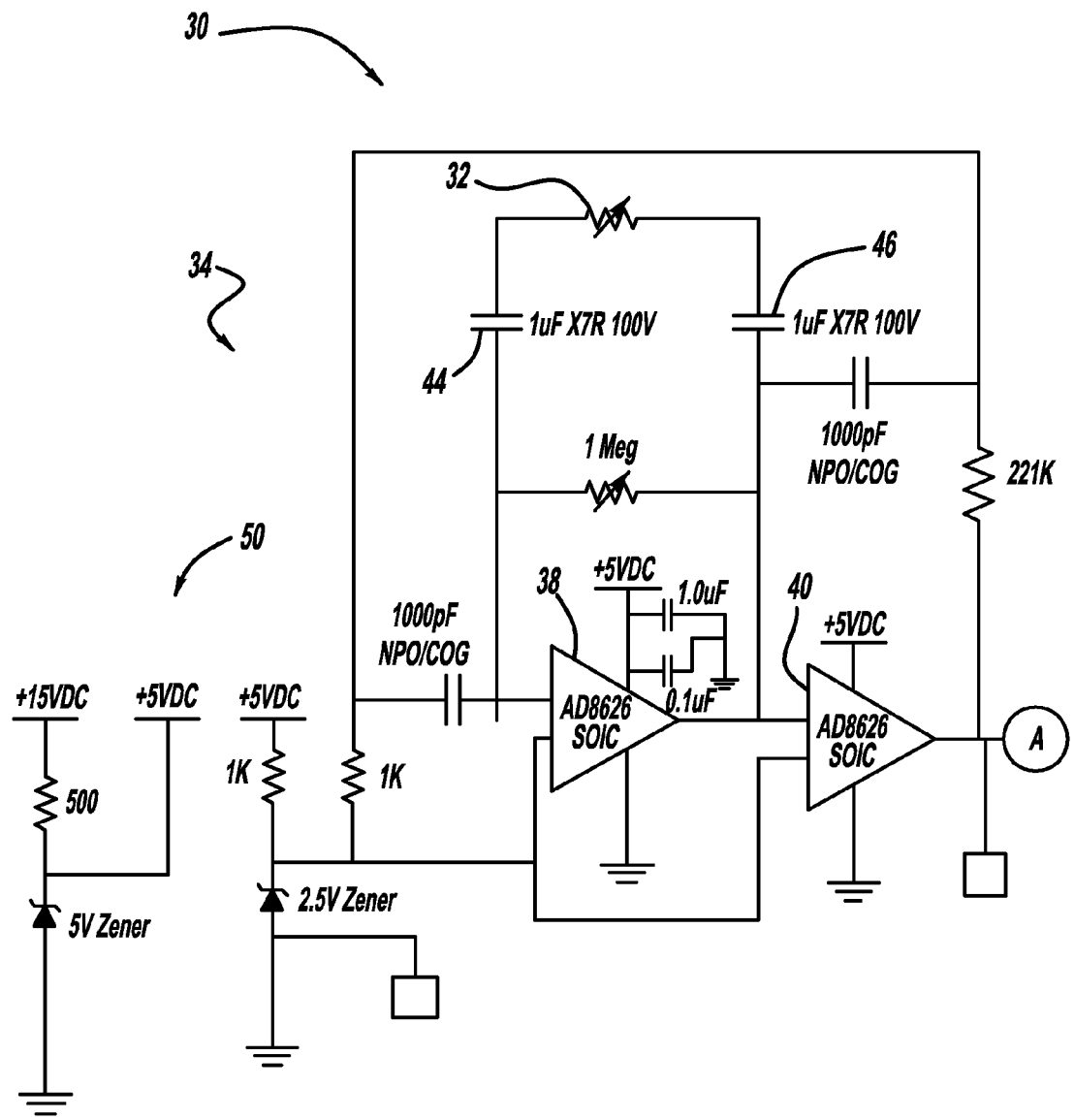
FIGS. 3a and 3b are a schematic diagram of a measurement circuit that measures a high impedance resistance signal from the sensor shown in FIGS. 1 and 2.
Figure 3B:
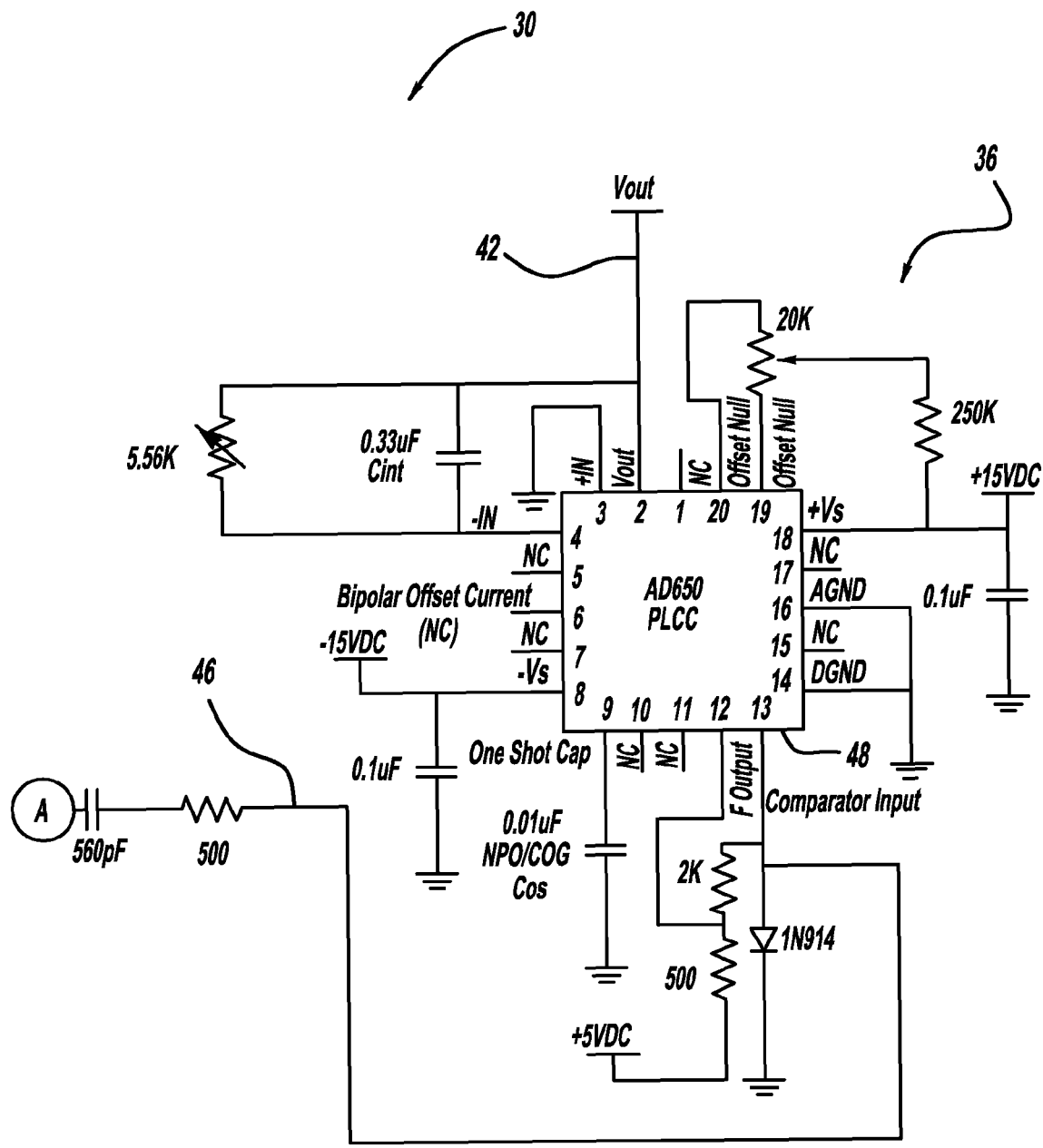

FIGS. 3a and 3b are a schematic diagram of a measurement circuit 30 of the type discussed above that is applicable to measure the resistance signal from the sensor 14. The various values of the circuit components shown in the measurement circuit 30 are merely examples and representative of values for those components. However, as will be appreciated by those skilled in the art, other values for these components may be equally applicable in other embodiments. In this diagram, a variable resistor 32 represents the sensor 14. The resistor 32 can be electrically coupled to the measurement circuit 30 by any suitable coupler for the purposes described herein, such as a Molex coupler.

The measurement circuit 30 includes a high impedance, resistance-to-frequency conversion circuit portion 34 and a frequency-to-voltage conversion portion 36. The resistance-to-frequency conversion circuit portion 34 includes an operational amplifier 38 that operates as an oscillator that generates a frequency signal indicative of the resistance of the resistance signal from the resistor 32. The frequency of the oscillator amplifier 38 is controlled by the resistance of the sensor 32. One of the electrode strips 16 or 18 is coupled to a first input line to the amplifier 38 and the other electrode strip 16 or 18 is electrically coupled to an output line of the amplifier 38. The amplifier 38 has a very high input impedance that is compatible with the resistance of the sensor 32. The sensor 32 is capacitor coupled to the circuit portion 34 by capacitors 44 and 46 to provide DC isolation requirements, as mentioned above. In one non-limiting embodiment, the oscillator amplifier 38 can be calibrated to operate at about 4 kHz when the sensor 32 is dry and at its highest resistance increasing to about 15 kHz as the sensor 32 becomes fully wetted and its resistance drops.

The sinusoidal output of the oscillator amplifier 38 is fed to an operational amplifier 40 operating as a comparator that converts the sine wave to a square wave of the same frequency. Particularly, the sinusoidal output frequency on the output line of the oscillator amplifier 38 is provided as a first input to the amplifier comparator 40, where the second inputs of the oscillator amplifier 38 and the comparator 48 are coupled together. The output of the comparator amplifier 40 is fed back to the first input of the oscillator amplifier 38 to create a self-oscillating circuit that creates the AC excitation required for the sensor 32. This oscillator/comparator circuit is tunable to accommodate the resistance of various sensor designs and frequency ranges compatible with other fuel cell system measurements, such as the HFR 1 kHz perturbation.

The square wave frequency signal from the comparator 40 is then provided to the frequency-to-voltage conversion circuit portion 36 on line 46 that converts the frequency signal to a representative voltage on output line 42. The converter circuit portion 36 employs an integrated circuit chip 48 that provides the conversion and is a known chip to those skilled in the art for this purpose. The chip 48 can be calibrated, in one non-limiting embodiment, to provide a 1 volt output at 4 kHz and a 5 volt output at 15 kHz. This level of output is easily read by common data acquisition and control systems, as well as being reasonably immune to low level EMI and RFI noise.

The circuit 30 also includes a voltage divider portion 50 that receives a 15 volt DC input and provides a 5 volt DC output. The 5 volt DC output is suitable for the oscillator amplifier 38, and other system components in the circuit 30. The measurement circuit 30 is very low power consumption circuit, such as 200 micro watts, and can operate with supply voltages ranging from 5V to 25V. Also, because it requires very few low cost components, it is easily applicable to automotive control system implementation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A measurement circuit for providing a voltage output from a resistance sensor, said measurement circuit comprising:
   a resistance-to-frequency conversion circuit electrically coupled to the sensor and providing an AC excitation signal to the sensor, said resistance-to-frequency conversion circuit being responsive to a resistance signal from the sensor that is to be measured, said resistance-to-frequency conversion circuit including an oscillator amplifier having a first input coupled to the sensor and an output coupled to the sensor, said oscillation amplifier generating a sinusoidal frequency signal having a frequency that changes based on the resistance of the resistance signal, said resistance-to-frequency conversion circuit further including a comparator amplifier having a first input coupled to the output of the oscillator amplifier, a second input coupled to a second input of the oscillator amplifier and an output coupled to the first input of the oscillator amplifier, said comparator amplifier being a feedback amplifier that converts the sinusoidal frequency signal from the oscillator amplifier to a square wave signal of the same frequency and causes the oscillator amplifier to be a self-oscillating circuit to provide the AC excitation signal to the sensor; and
   a frequency-to-voltage conversion circuit responsive to the square wave signal from the comparator oscillator, said frequency-to-voltage conversion circuit converting the frequency signal to a representative voltage signal.

2. The circuit according to claim 1 wherein a signal line coupling the sensor to the first input of the oscillator amplifier and a signal line coupling the sensor to the output of the oscillator amplifier include capacitors to provide DC voltage isolation of the oscillator amplifier.

3. The circuit according to claim 1 wherein the sensor is a liquid water sensor having a relatively high impedance.

4. The circuit according to claim 3 wherein the sensor senses water in a flow channel of a fuel cell.

5. The circuit according to claim 3 wherein the sensor includes a pair of electrode strips separated by a gap where the liquid water lays across the electrode strips and changes the resistance of the sensor where the resistance of the sensor is reduced depending on how much of the length of the strips is covered by liquid water.

6. The circuit according to claim 3 wherein the sensor has an impedance of about 1 megaohm.

7. The circuit according to claim 1 wherein the oscillator amplifier is calibrated so that the oscillator amplifier provides about a 4 kHz signal when the resistance of the sensor is at its highest and about a 15 kHz signal when the resistance of the sensor is at its lowest.

8. The circuit according to claim 1 wherein the frequency-to-voltage conversion circuit is calibrated to provide a 1 volt output when the resistance of the sensor is at its highest and about a 5 volt output when the resistance of the sensor is at its lowest.

9. A measurement circuit for providing a voltage output from a resistance sensor, said measurement circuit comprising:
   a resistance-to-frequency conversion circuit electrically coupled to the sensor and providing an excitation signal to the sensor, said resistance-to-frequency conversion circuit being responsive to a resistance signal from the sensor that is to be measured, said resistance-to-frequency conversion circuit including an oscillator coupled to the sensor that converts the resistance signal to a frequency signal having a frequency that changes based on the resistance of the resistance signal, said resistance-to-frequency conversion circuit further including a comparator having a first input coupled to an output of the oscillator, a second input coupled to a first input of the oscillator and an output coupled to a second input of the oscillator, said comparator converting the frequency signal from the oscillator to a converted frequency signal; and
   a frequency-to-voltage conversion circuit responsive to the converted frequency signal from the resistance-to-frequency conversion circuit, said frequency-to-voltage conversion circuit converting the converted frequency signal to a representative voltage signal.

10. The circuit according to claim 9 wherein the oscillator in the resistance-to-frequency conversion circuit is an oscillator amplifier where the second input of the oscillator amplifier is coupled to the sensor and the output of the oscillator amplifier is coupled to the sensor, said comparator being a feedback amplifier that converts the frequency signal from the oscillator amplifier to a square wave signal and causes the oscillator amplifier to be a self-oscillating circuit to provide the excitation signal to the sensor.

11. The circuit according to claim 10 wherein a signal line coupling the sensor to the second input of the oscillator amplifier and a signal line coupling the sensor to the output of the oscillator amplifier include a capacitor to provide DC voltage isolation of the oscillator amplifier.

12. The circuit according to claim 9 wherein the sensor is a liquid water sensor having a relatively high impedance.

13. The circuit according to claim 12 wherein the sensor senses water in a flow channel of a fuel cell.

14. The circuit according to claim 12 wherein the sensor includes a pair of electrode strips separated by a gap where the liquid water lays across the electrode strips and changes the resistance of the sensor where the resistance of the sensor is reduced depending on how much of the length of the strips are covered by liquid water.

15. The circuit according to claim 12 wherein the sensor has an impedance of about 1 megaohm.

16. The circuit according to claim 9 wherein the oscillator is calibrated so that the oscillator provides about a 4 kHz frequency signal when the resistance of the sensor is at its highest and about a 15 kHz frequency signal when the resistance of the sensor is at its lowest.

17. The circuit according to claim 9 wherein the frequency-to-voltage conversion circuit is calibrated to provide a 1 volt output when the resistance of the sensor is at its highest and about a 5 volt output when the resistance of the sensor is at its lowest.

18. The circuit according to claim 9 wherein the excitation signal provided to the sensor is an AC excitation signal.

19. A measurement circuit for providing a voltage output for a liquid water resistance sensor having a relatively high impedance, said resistance sensor being positioned in a flow channel of a fuel cell to sense liquid water therein, said measurement circuit comprising:

a resistance-to-frequency conversion circuit electrically coupled to the sensor and providing an AC excitation signal to the sensor, said resistance-to-frequency conversion circuit being responsive to a resistance signal from the sensor that is to be measured, said resistance-to-frequency conversion circuit including an oscillator amplifier having a first input coupled to the sensor and an output coupled to the sensor, said oscillation amplifier generating a sinusoidal frequency signal having a frequency that changes based on the resistance of the resistance signal, said resistance-to-frequency conversion circuit further including a comparator amplifier having a first input coupled to the output of the oscillator amplifier, a second input coupled to a second input of the oscillator amplifier and an output coupled to the first input of the oscillator amplifier, said comparator amplifier being a feedback amplifier that converts the sinusoidal frequency signal from the oscillator amplifier to a square wave signal of the same frequency and causes the amplifier to be a self-oscillating circuit to provide the AC excitation signal to the sensor;

a first capacitor provided in a signal line coupling the sensor to the first input of the oscillator amplifier and a second capacitor provided in a signal line coupling the sensor to the output of the oscillator amplifier, said first and second capacitors providing DC voltage isolation for the oscillator amplifier; and a frequency-to-voltage conversion circuit responsive to the square wave signal from the comparator oscillator, said frequency-to-voltage conversion circuit converting the frequency signal to a representative voltage signal.

20. The circuit according to claim 19 wherein the oscillator amplifier is calibrated so that the oscillator amplifier provides about a 4 kHz signal when the resistance of the sensor is at its highest and about a 15 kHz signal when the resistance of the sensor is at its lowest, and wherein the frequency-to-voltage conversion circuit is calibrated to provide a 1 volt output when the oscillator circuit generates the 4 kHz frequency signal and a 5 volt output when the oscillator amplifier generates the 15 kHz frequency signal.

* * * * *